US007713455B2

(12) United States Patent
Ozeki et al.

(10) Patent No.: US 7,713,455 B2

(45) Date of Patent: May 11, 2010

(54) METHOD OF MANUFACTURING A MOLDING WITH A CORE

(75) Inventors: Yuichi Ozeki, Nagoya (JP); Kentaro Izumi, Nagoya (JP); Kenji Harada, Kyotanabe (JP)

(73) Assignees: Sanwa Kagaku Kenkyusho Co., Ltd., Nagoya-shi (JP); Kikusui Seisakusho Ltd., Kyoto (JP)

( * ) Notice: Subject to any disclaimer, the term of this patent is extended or adjusted under 35 U.S.C. 154(b) by 378 days.

(21) Appl. No.: 10/578,528

(22) PCT Filed: Nov. 11, 2004

(86) PCT No.: PCT/JP2004/016759

§ 371 (c)(1), (2), (4) Date: May 8, 2006

(87) PCT Pub. No.: WO2005/046978

PCT Pub. Date: May 26, 2005

(65) Prior Publication Data

US 2008/0116606 A1 May 22, 2008

(30) Foreign Application Priority Data

Nov. 14, 2003 (JP) .......................... P2003-384502

(51) Int. Cl.
*B29C 43/04* (2006.01)

(52) U.S. Cl. ....................... 264/113; 264/112; 264/241; 264/250; 264/255; 264/260; 425/344; 425/345; 425/353; 425/355; 425/447

(58) Field of Classification Search ................. 264/112, 264/120, 250, 255, 259, 260, 299, 319, 113, 264/241, 320; 425/352, 112, 78, 216, 344, 425/345, 353, 354, 355, 195, 406, 415, 416, 425/447

See application file for complete search history.

(56) References Cited

U.S. PATENT DOCUMENTS 2,135,803 A * 11/1938 Dumert ....................... 419/66
3,096,248 A * 7/1963 Rudzki ....................... 264/112

(Continued)

FOREIGN PATENT DOCUMENTS

JP 61-297000 A 12/1986
WO WO01/98067 A1 12/2001
WO WO 02/090098 A1 11/2002

OTHER PUBLICATIONS

International Search Report mailed Feb. 15, 2005 of International Application PCT/JP2004/016759.

*Primary Examiner*—Steven P Griffin
*Assistant Examiner*—Seyed Masoud Malekzadeh
(74) *Attorney, Agent, or Firm*—Westerman, Hattori, Daniels & Adrian, LLP

(57) ABSTRACT

The present invention provides a method for manufacturing a molding with a core by using compression molding means having upper and lower double-structured punches; the method comprising the steps of supplying molding material for the core and molding material for the outer layer respectively, the step of compression-molding the molding material for the core and/or the molding material for the outer layer, and the step of compression-molding the whole molding with a core, wherein: the step of supplying the molding material for the outer layer posterior to the step of supplying the molding material for the core is performed until a tip of the lower center punch finally takes a position protruding from a tip of the lower outer punch; and the step of compression-molding the whole molding with a core is performed with the tips of the lower center punch and the lower outer punch aligned with each other. This method can be expected to bring about the effect of enhancing the strength of a portion of outer layer forming the sidewall of the molding and/or the effect of allowing the molding material for the outer layer supplied after the step of supplying the molding material for the core to be led to under the temporary molding of the core thereby making it possible to manufacture a molding with a core through the molding material supply step performed twice.

9 Claims, 3 Drawing Sheets

U.S. PATENT DOCUMENTS 3,177,077 A * 4/1965 Maurice et al. ................ 419/2
3,255,278 A * 6/1966 Smith ............................ 264/5
3,342,915 A * 9/1967 Wanderer ................... 264/522
3,571,854 A * 3/1971 Lundstrom ................... 425/77
3,677,673 A * 7/1972 Shapiro ....................... 425/78
4,050,865 A * 9/1977 Drostholm et al. .......... 425/183
4,102,966 A * 7/1978 Duperray et al. ............ 264/112
4,390,488 A * 6/1983 Wessel ........................ 419/66
4,419,413 A * 12/1983 Ebihara ...................... 428/548
5,032,335 A * 7/1991 Wilson ....................... 264/113
5,043,123 A * 8/1991 Gormanns et al. .......... 264/113
5,071,607 A * 12/1991 Ayer et al. .................. 264/112
5,088,915 A * 2/1992 Korsch et al. ............... 425/345
5,100,604 A * 3/1992 Yamashita et al. .......... 264/115
5,158,728 A * 10/1992 Sanderson et al. .......... 264/113
5,160,747 A * 11/1992 Kizaki et al. ................ 425/352
5,221,503 A * 6/1993 Ward et al. .................. 264/104
5,326,242 A * 7/1994 Katagiri et al. ............... 425/78
5,378,416 A * 1/1995 Kishi et al. ................ 264/40.5
5,460,827 A * 10/1995 Sanderson et al. .......... 424/472
6,068,465 A * 5/2000 Wilson ....................... 425/193
6,423,264 B1 * 7/2002 Gay ........................... 264/611
6,602,569 B2 * 8/2003 Yamashita et al. ......... 428/64.1
6,890,168 B2 * 5/2005 Kim ............................ 425/78
7,156,631 B2 * 1/2007 Ozeki .......................... 425/78
2003/0160353 A1 * 8/2003 Robinson et al. ............ 264/109
2004/0113319 A1 * 6/2004 Kondo et al. ................ 264/319
2004/0131717 A1 * 7/2004 Shimada et al. ............. 425/345
2004/0247728 A1 * 12/2004 Ozeki ......................... 425/354
2005/0013960 A1 * 1/2005 Ozeki et al. ................... 428/43
2005/0202082 A1 * 9/2005 Hibino et al. ............... 424/464
2005/0220872 A1 * 10/2005 Ozeki ......................... 424/468

* cited by examiner

METHOD OF MANUFACTURING A MOLDING WITH A CORE

TECHNICAL FIELD

The present invention relates to a method of manufacturing a molding by compression of such a molding material as powder granule and, more specifically, to a method of manufacturing a molding with a core by using punches of a double structure.

BACKGROUND ART

A method of manufacturing a molding by compressing and solidifying molding material, a representative of which is powder granule etc., is generally used in a wide range of industry including, for example, not only industrial fields of pharmaceuticals and foods (functional foods and general foods) but also electronic material fields such as molding of semiconductor encapsulating resin, battery-related products, powder metallurgy-related products, electronic functional parts and the like, and fields of agricultural chemicals and sanitary products.

In the field of pharmaceuticals, among formulations for oral administration in particular, a solid molding called "tablet" is presently one of the most widely used form of medicines in view of various merits including simplicity and convenience in manufacturing and easiness of oral administration. Among such moldings, the molding having an internal core is called "tablet with a core" since such a molding is manufactured by compression-molding powder granule placed around a core (center tablet) to form an outer layer.

Such a molding with a core as a dry coated tablet was conventionally manufactured by a method comprising: preparing a core as a molding by another tablet machine previously; supplying the core as a molding into a die of a dry coated tablet machine fed and filled with powder granule for an outer layer; and further supplying and compression-molding the powder granule for the outer layer. This manufacturing method involves serious problems of an increased amount of operation and a lowered production efficiency as compared with a method of manufacturing an general compression molding. Further, the method involves problems associated with feeding of cores, such as an occurrence of a tablet with no core, multiple cores, or off-centered core and hence requires a complicated mechanism or apparatus for monitoring core feeding and checking final molded products to assure the quality of each product, thus resulting in the machine or equipment increased in size and complicated in structure.

In view of such circumstances, the inventors of the present invention invented a method of manufacturing a molding with a core efficiently from such a molding material as powder granule at a time, as described in patent document 1. This method uses compression molding means having a die and an upper and a lower punches, of which at least the upper punch, preferably both of the upper and lower punches have a double structure comprising a center punch and an outer punch surrounding the outer periphery of the center punch, both of the center punch and the outer punch being slidable and capable of a compressing operation. This manufacturing method comprises: the steps of supplying molding material for the core and molding material for the outer layer respectively; the step of compression-molding the molding material for the core and/or the molding material for the outer layer; and the step of compression-molding the whole molding with a core.

Further, the inventors of the present invention invented a rotary compression molding machine described in patent document 2 as an apparatus for practicing the aforementioned method of manufacturing a molding with a core.

A specific example of such a method of manufacturing a molding with a core by using upper and lower punches both having such a double structure comprises: an outer layer supply step 1 of supplying molding material for the outer layer into a space defined above a lower center punch and enclosed by a lower outer punch; a core supply step of supplying molding material for the core into a space defined above the molding material for the outer layer supplied in the preceding step and enclosed by the lower outer punch; an outer layer and core molding step of compression-molding the molding material for the outer layer and the molding material for the core supplied in the preceding steps; an outer layer supply step 2 of supplying the molding material for the outer layer into a space defined above and around the outer layer and core molding in the die molded in the preceding step; and a whole molding step of compression-molding the outer layer and core molding and the molding material for the outer layer.

Patent Document 1: International Laid-Open Publication No. WO 01/98067 pamphlet

Patent Document 2: International Laid-Open Publication No. WO 02/90098 pamphlet

DISCLOSURE OF INVENTION

The inventors of the present invention became aware of the fact that the molding manufactured according to the aforementioned method of manufacturing a molding with a core by using the double-structured punches might not have a enough strength. The inventors investigated the cause of this fact and found out the problem regarding the packing density of the molding material for the outer layer supplied into the space defined above and around the outer layer and core molding in the outer layer supply step 2. In other words, the amount of molding material for the outer layer supplied into the space around the temporary molding of the outer layer and the core, that is, the space defined between the outer layer and core molding and the lower outer punch is equivalent to the thickness of the temporary molding of the outer layer and the core and, for this reason, the packing density of the molding material for the outer layer supplied in this part is insufficient. It was therefore found out that the strength of a portion of the outer layer forming the sidewall of the molding was sometimes insufficient. The present invention has been made in order to solve this problem.

The inventors of the present invention have solved the aforementioned problem by increasing the amount of the molding material for the outer layer to be supplied into the space between the outer layer and core molding and the lower outer punch in the outer layer supply step 2. Specifically, the outer layer supply step 2 of supplying the molding material for the outer layer into the space defined above and around the aforementioned outer layer and core molding, that is, the step of supplying the molding material for the outer layer (the last outer layer supply step) posterior to the step of supplying the molding material for the core is performed until the tip of the lower center punch finally takes a position protruding from the tip of the lower outer punch by further lowering the lower outer punch tip, whereby the packing density of the molding material for the outer layer forming the sidewall of the molding can be increased and, hence, the strength of a portion of the outer layer that forms the sidewall of the molding can be enhanced.

Further, surprisingly, a phenomenon has been observed such that if the outer layer supply step 2 is performed as described above under certain conditions, the molding material for the outer layer supplied in the outer layer supply step 2 is led to under the outer layer and the core molding during the process of aligning the tips of the lower center punch and the lower outer punch with each other to allow the subsequent whole molding step to be performed. This means that the molding with a core can be prepared even if the first outer layer supply step 1 is eliminated. Thus, a novel invention has been completed.

That is, the present invention provides a method for manufacturing a molding with a core by using compression molding means having an upper punch and a lower punch which are arranged in the vertical direction of a die, both of the upper punch and the lower punch having a double structure comprising a center punch and an outer punch surrounding the outer periphery of the center punch, and being slidable and capable of a compressing operation; the method comprising the steps of supplying molding material for the core and molding material for the outer layer respectively, the step of compression-molding the molding material for the core and/or the molding material for the outer layer, and the step of compression-molding the whole molding with a core, wherein: the step of supplying the molding material includes the step of supplying the molding material for the core and the subsequent step of supplying the molding material for the outer layer; the step of supplying the molding material for the outer layer is performed until a tip of the lower center punch finally takes a position protruding from a tip of the lower outer punch; and the step of compression-molding the whole molding with a core is performed with the tips of the lower center punch and the lower outer punch aligned with each other.

In this method, the step of supplying the molding material for the outer layer can be performed prior to the step of supplying the molding material for the core as in the conventional art. In this case, the step of supplying the molding material usually consists of the three steps: the first step of supplying the molding material for the outer layer; the subsequent step of supplying the molding material for the core; and the second subsequent step of supplying the molding material for the outer layer.

According to the present invention, a molding with a core can be manufactured without performing the step of supplying the molding material for the outer layer prior to the step of supplying the molding material for the core. In this case, the step of supplying the molding material usually consists of the two steps: the step of supplying the molding material for the core; and the subsequent step of supplying the molding material for the outer layer.

An essential feature of the present invention is that the step of supplying the molding material for the outer layer, which follows the step of supplying the molding material for the core, is performed until the tip of the lower center punch finally takes a position protruding from the tip of the lower outer punch, and then the step of compression-molding the whole molding is performed with the tips of the lower center punch and the lower outer punch aligned with each other. This feature gives rise to the effect of enhancing the strength of the sidewall of the molding and/or the effect of allowing the manufacture of a molding with a core to be achieved through the step of supplying molding material performed twice.

In a case of the present invention, it is possible to obtain a molding with a core having a enhanced and sufficient strength in a portion of the outer layer forming the sidewall thereof when the molding with a core is manufactured by the method using compression molding means having an upper and a lower punch and a die, both of the upper punch and the lower punch having a double structure comprising a center punch and an outer punch surrounding the outer periphery of the center punch, and being slidable and capable of a compressing operation. In another case of the present invention, it is possible to eliminate the outer layer supply step 1 preceding the step of supplying the molding material for the core, because the last supplied molding material for the outer layer is led to under the outer layer and core molding. Hence, the molding with a core can be manufactured through the step of supplying molding material performed twice. In the method of manufacturing a molding with a core through the step of supplying molding material performed twice, it is possible to manufacture a molding with a core while enhancing the strength of a portion of the outer layer forming the sidewall of the molding. Further in another case of the present invention, the aforementioned phenomenon that the molding material for the outer layer is led to under the outer layer and core molding provides no boundary between a portion of outer layer forming the bottom of the molding and a portion of outer layer forming the sidewall of the molding, thus making it possible to prevent contamination of the molding material for the core which would otherwise occur frequently in the conventional manufacturing method on the bottom surface of the molding due to the provisionally molded core shaved during the preparation process.

DESCRIPTION OF REFERENCE CHARACTERS

3 . . . die

Figure 1:
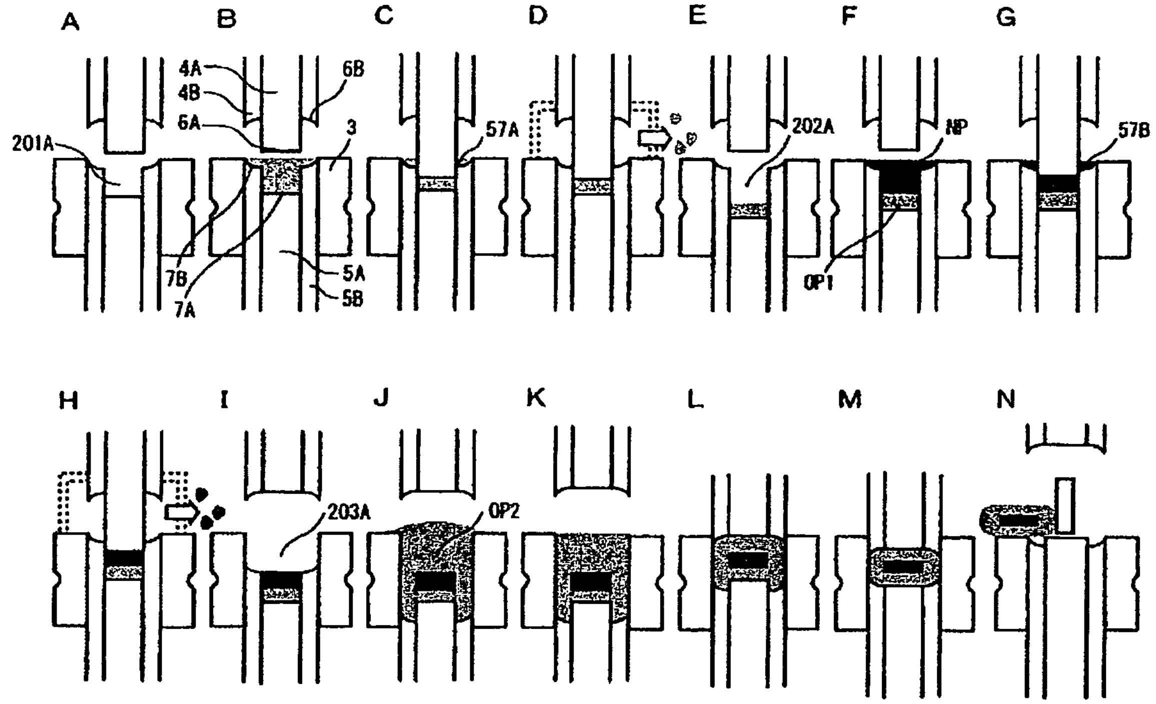
FIG. 1 is an explanatory view illustrating movement of punch tips in a first mode for carrying out the method of manufacturing a molding with a core according to the present invention. (Hatching representing a section is omitted for convenience.)

4A . . . upper center punch

4B . . . upper outer punch

5A . . . lower center punch

5B . . . lower outer punch

NP . . . molding material for the core

OP1 . . . first molding material for the outer layer
OP2 . . . second molding material for the outer layer

BEST MODE FOR CARRYING OUT THE INVENTION

The term "molding material", as used in the present specification, is meant to include all moldable material including both wet and dry material such as powder granule etc. The term "powder granule" is used to represent any one of material including all of powder, granule/pellet and analog thereof. Preferably, powder granule is used as the molding material.

The method of the present invention is an improved invention of the method described in patent document 1. Specifically, the invention described in patent document 1 is a method of manufacturing a molding with a core by using compression molding means having an upper punch and a lower punch in the vertical direction of a die, both of the upper punch and the lower punch having a double structure comprising a center punch and an outer punch surrounding the outer periphery of the center punch, and being slidable and capable of a compressing operation, the method comprising: an outer layer supply step 1 of supplying molding material for the outer layer into a space defined above a lower center punch and enclosed by a lower outer punch; a core supply step of supplying a molding material for the core into a space defined above the molding material for the outer layer supplied in the preceding step and enclosed by the lower outer punch; an outer layer and a core molding step of compression-molding the molding material for the outer layer and molding material for the core supplied in the preceding steps; an outer layer supply step 2 of supplying the molding material for the outer layer into a space defined above and around the outer layer and core molding in the die which has been molded in the preceding step; and an whole molding step of compression-molding the outer layer and core molding and the molding material for the outer layer.

According to the method of the present invention, the outer layer supply step 2 is performed until a tip of the lower center punch finally takes a position protruding from a tip of the lower outer punch and then the whole molding step is performed with the tips of the lower center punch and the lower outer punch aligned with each other in the method described in patent document 1. By so doing, it is possible to eliminate the outer layer supply step 1. Specifically, the method of the present invention can be expressed as follows.

A method for manufacturing a molding with a core by using compression molding means having an upper punch and a lower punch which are arranged in the vertical direction of a die, both of the upper punch and the lower punch having a double structure comprising a center punch and an outer punch surrounding the outer periphery of the center punch, and being slidable and capable of a compressing operation; the method comprising a core supply step of supplying molding material for the core into a space defined above the lower center punch and enclosed by the lower outer punch, a core molding step of compression-molding the molding material for the core supplied in the preceding step; an outer layer supply step of supplying molding material for the outer layer into a space defined above and around the molding in the die which has been molded in the preceding step until a tip of the lower center punch finally takes a position protruding from a tip of the lower outer punch; and a whole molding step of compression-molding the core molding and the molding material for the outer layer with the tips of the lower outer punch and the lower center punch aligned with each other.

This method may include an outer layer supply step of supplying the molding material for the outer layer in the space defined above the lower center punch and enclosed by the lower outer punch prior to the core supply step like the conventional method. If this outer layer supply step is performed, it is preferable to perform an outer layer molding step of compression-molding the molding material for the outer layer after the outer layer supply step. In any case, the compression molding step other than the whole molding step are preferably performed as temporary compression. The expression "the whole molding step is performed with the tips of the lower center punch and the lower outer punch aligned with each other", as used herein, is meant to include the case where the whole molding step is performed after the tips of the lower center punch and the lower outer punch have been aligned with each other and the case where the whole molding step is performed while aligning the tips of the lower center punch and the lower outer punch with each other.

In the outer layer supply step of supplying the molding material for the outer layer until the tip of the lower center punch finally takes a position protruding from the tip of the lower outer punch, the amount of protrusion of the tip of the lower center punch from the tip of the lower outer punch, that is, the amount of descent of the tip of the lower outer punch relative to the tip of the lower center punch has preferable ranges to meet respective purposes.

When the effect of enhancing the strength of a portion of outer layer forming the sidewall of the molding (hereinafter will be referred to as the effect of filling with a high-density outer layer) is desired, the amount of descent of the tip of the lower outer punch must not be too much. This is because if the tip of the lower center punch protrudes too much from the tip of the lower outer punch, stated otherwise, if the tip of the lower outer punch is lowered too much relative to the tip of the lower center punch, a resulting excessive rise in the density of the outer layer forming the sidewall of the molding gives rise to a density difference between the core portion and the outer layer portion, thus causes deterioration of the formability of the whole molding. For this reason, it is preferable to supply the molding material for the outer layer with the amount of protrusion of the tip of the lower center punch or the amount of descent of the tip of the lower outer punch adjusted so as not to produce a large difference of the powder layer density between the core portion and the outer layer portion of the molding with a core after the whole molding step. The optimum amount of descent of the tip of the lower outer punch cannot be determined unconditionally because the optimum amount of descent varies depending upon various conditions including the shape and size of the temporary molding, the thickness of the outer layer, and the density of the temporary molding. However, in the manufacture of a common tablet with a core, the amount of descent of the tip of the lower outer punch is preferably about 2 to 0.5 times as much as the thickness of the molding including a core that has been temporarily molded before this step.

When the effect of allowing the manufacture of a molding with a core to be achieved through the molding material supply step performed twice (hereinafter will be referred to as the effect of leading an outer layer) is desired, a sufficient amount of descent of the tip of the lower outer punch to a certain degree is needed so as to allow the molding material for the outer layer to be led to under the temporary molding of the core. Though the "sufficient amount of descent of the tip of the lower outer punch to a certain degree", as used herein, cannot be determined unconditionally because the sufficient amount of descent varies depending upon various conditions including the shape and size of the temporary molding, the thickness of the outer layer, and the density of the temporary molding. However, in the manufacture of a common tablet with a core, the sufficient amount of descent is preferably about 0.5 to 8 times as much as the thickness of the temporary molding containing a core that has been temporarily molded before this step.

After the tip of the lower center punch has finally taken the position protruding from the tip of the lower outer punch in the outer layer supply step, the process of aligning the tips of the lower center punch and the lower outer punch with each other for the subsequent whole molding step can be achieved by raising the lower outer punch or lowering the lower center punch, or lowering the lower center punch while raising the lower outer punch. Which of these options to be selected is determined depending upon the purpose to a certain degree. Namely, it is basically advantageous that: the method to raise the lower outer punch is selected when the effect of filling with a high-density outer layer is desired; the method to lower the lower center punch is selected when the effect of leading an outer layer is desired; and the method to lower the lower center punch while raising the lower outer punch is selected when both of the effects are desired.

In any selected method, the condition of the upper punch is an important factor in attaining the purpose. Namely, in the case of the method to raise the lower outer punch, the effect of filling with a high-density outer layer can be accomplished sufficiently by performing the operation of aligning the tips of the lower center punch and the lower outer punch with each other from the position in which the tip of the lower center punch is protruded from the tip of the lower outer punch with the upper center punch and upper outer punch pressing the molding material in the die. In the case of the method to raise the lower outer punch, the effect of leading an outer layer can be expected by performing the operation of aligning the tips of the lower center punch and the lower outer punch with each other from the position in which the tip of the lower center punch is protruded from the tip of the lower outer punch with the upper center punch and upper outer punch not pressing the molding material in the die.

On the other hand, in the case of the method to lower the lower outer punch, the effect of leading an outer layer can be accomplished sufficiently by performing the process of pressing the molding material in the die by the upper center punch and the upper outer punch in the position in which the tip of the lower center punch is protruded from the tip of the lower outer punch. And in the case of the method to lower the lower center punch while raising the lower outer punch, both of the effects can be accomplished sufficiently by performing the operation of aligning the tips of the lower center punch and the lower outer punch with each other from the position in which the tip of the lower center punch is protruded from the tip of the lower outer punch with the upper center punch and upper outer punch pressing the molding material in the die.

After all, the present invention generally performs the process of pressing the molding material in the die by the upper center punch and the upper outer punch during the operation of aligning the tips of the lower center punch and the lower outer punch with each other from the position in which the tip of the lower center punch is protruded from the tip of the lower outer punch. Note that the expression "pressing the molding material in the die by the upper center punch and the upper outer punch", as used herein, means light pressurization to such an extent that the upper center punch and upper outer punch covering the molding material in the die press the molding material by their own weights or to such an extent as to press the molding material in the die by lowering the upper punch along the rail of the upper punch, unlike a common compression molding process using a compression roll. Though not preferable, the molding material may be pressed by using an ordinary compression roll.

Even in the method of the present invention, the step of removing residual molding material remaining on the lower outer punch is necessary to be performed or preferable to be performed depending on the punch tip shape. Refer to patent document 1 with respect to the details of such cases.

Hereinafter, a first mode for carrying out the method of manufacturing a molding with a core according to the present invention will be described in detail with main reference to FIG. 1.

Initially, with the lower center punch 5A in a lowered position (FIG. 1A), molding material for the first outer layer OP1 is supplied into the first outer layer space 201A defined above the lower center punch 5A and enclosed by the lower outer punch 5B (FIG. 1B). When required, the lower center punch 5A is raised to discharge excess of the first molding material for the outer layer out of the die. Thereafter, the upper center punch 4A and the lower center punch 5A are moved toward each other and pressed temporarily (FIG. 1C) to mold the first outer layer.

Subsequently, with the temporary molding of the first outer layer OP1 held by the lower center punch 5A and the lower outer punch 5B, molding material for the core NP is supplied into the core space 202A defined above the temporary molding of the first outer layer OP1 and enclosed by the lower outer punch 5B (FIGS. 1E and 1F). Thereafter, the lower center punch 5A is raised to discharge excess of the molding material for the core out of the die when required, and then the upper center punch 4A and the lower center punch 5A are moved toward each other and pressed temporarily (FIG. 1G) to mold the first outer layer temporary molding and the core.

Further, with the temporary molding of the first outer layer and the core held on the lower center punch 5A, molding material for the second outer layer OP2 is supplied into the second outer layer space 203A defined above and around the temporary molding of the first outer layer and the core in the die 3 (FIGS. 1J and 1K) until the tip of the lower center punch takes a position properly protruding from the tip of the lower outer punch by lowering the lower punch (both of the lower center punch 5A and the lower outer punch 5B or the lower outer punch 5B alone) (FIG. 1I) and then further lowering the lower outer punch 5B. With the temporary molding of the core held on the temporary molding of the first outer layer being completely covered by the molding material for the outer layer and the temporary molding of the outer layer, excess of the molding material for the second outer layer OP2 is discharged out of the die when required (FIG. 1K). Here, it is possible to supply the molding material for the second outer layer OP2 after the lower outer punch 5B has been previously lowered sufficiently to protrude the lower center punch tip from the lower outer punch tip. Thereafter, with the upper center punch and upper outer punch pressing the molding material in the die, the lower outer punch tip is raised to align with the lower center punch tip (FIGS. 1L and 1M). Then, the upper punch (upper center punch 4A and upper outer punch 4B) and the lower punch (lower center punch 5A and lower outer punch 5B) are moved toward each other to perform main compression finally on the whole molding consisting of the first outer layer, the core, and the second outer layer (FIG. 1M), optionally with pre-compression (temporary compression) when required. FIG. 1N illustrates the step of taking out the completed molding.

The step of removing residual molding material 57 (57A and 57B) remaining on the lower outer punch 7B (FIGS. 1D and 1H) is preferably added, depending on the shape of the tip portion (depicted at 7B in FIG. 1) of the outer punch, after supply of the first outer layer OP1 or during compression molding or after compression molding thereof and after supply of the core NP or during compression molding or after compression molding thereof in order to prevent contamination of the molding material for the outer layer and the molding material for the core. With respect to the details of this removal step, refer to patent document 1 again.

Figure 2:
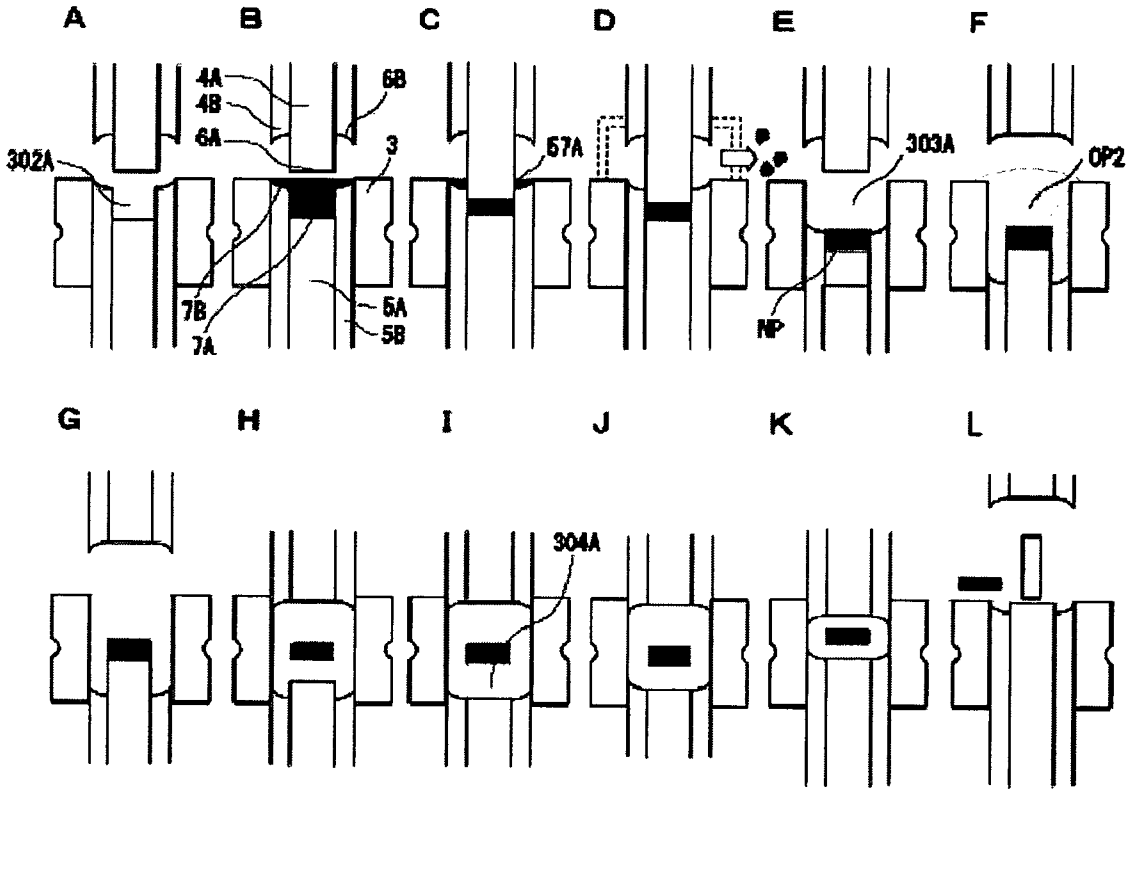
FIG. 2 is an explanatory view illustrating movement of punch tips in a second mode for carrying out the method of manufacturing a molding with a core according to the present invention. (Hatching representing a section is omitted for convenience.)

Next, a second mode for carrying out the method of manufacturing a molding with a core according to the present invention will be described in detail with main reference to FIG. 2.

Initially, with the lower center punch 5A in a lowered position (FIG. 2A), molding material for the core NP is supplied into the core space 302A defined above the lower center punch 5A and enclosed by the lower outer punch 5B (FIG. 2B). When required, the lower center punch 5A is raised to discharge excess of the core NP molding material out of the die. Thereafter, the upper center punch 4A and the lower center punch 5A are moved toward each other and pressed temporarily (FIG. 2C) to mold the core.

Subsequently, with the temporary molding of the core held on the lower center punch 5A, molding material for the outer layer OP2 is supplied into the outer layer space 303A defined above and around the temporary molding of the core in the die 3 until the lower center punch tip takes a position properly protruding from the lower outer punch tip by lowering the lower punch (both of the lower center punch 5A and the lower outer punch 5B or the lower outer punch 5B alone)(FIG. 2E) and then further lowering the lower outer punch 5B (FIG. 2F). When required, excess of the molding material for the outer layer OP2 is discharged out of the die (FIG. 2G). Here, it is possible to supply the molding material for the outer layer OP2 after the lower outer punch 5B has been previously lowered sufficiently to protrude the lower center punch tip from the lower outer punch tip. Thereafter, with the lower center punch tip in the position protruding from the lower outer punch tip, the molding material in the die is lightly pressed by the upper center punch and the upper outer punch and then the lower center punch tip is lowered to form the space 304A between the temporary molding of the core and the lower center punch, thus allowing the molding material for the outer layer OP2 to be led to fill the space 304A (FIGS. 2H to 2J). With the lower center punch tip and the lower outer punch tip thus aligned with each other finally, the upper punch (upper center punch 4A and upper outer punch 4B) and the lower punch (lower center punch 5A and lower outer punch 5B) are moved toward each other to perform main compression finally on the whole molding consisting of the core and the outer layer (FIG. 2K), optionally with pre-compression (temporary compression) when required. FIG. 2L illustrates the step of taking out the completed molding.

Figure 3:
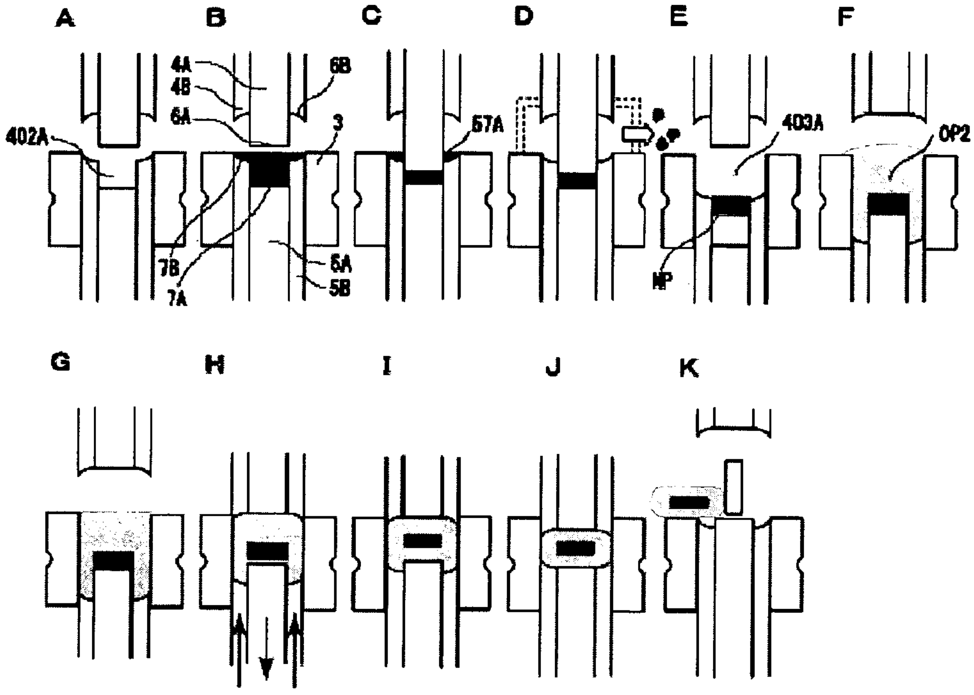
FIG. 3 is an explanatory view illustrating movement of punch tips in a third mode for carrying out the method of manufacturing a molding with a core according to the present invention. (Hatching representing a section is omitted for convenience.)

Next, a third mode for carrying out the method of manufacturing a molding with a core according to the present invention will be described in detail with main reference to FIG. 3.

Initially, with the lower center punch 5A in a lowered position (FIG. 3A), molding material for the core NP is supplied into the core space 402A defined above the lower center punch 5A and enclosed by the lower outer punch 5B (FIG. 3B). When required, the lower center punch 5A is raised to discharge excess of the core NP molding material out of the die. Thereafter, the upper center punch 4A and the lower center punch 5A are moved toward each other and pressed temporarily (FIG. 3C) to mold the core.

Subsequently, with the temporary molding of core held on the lower center punch 5A, molding material for the outer layer OP2 is supplied into the outer layer space 403A defined above and around the temporary molding of the core in the die 3 until the lower center punch tip takes a position properly protruding from the lower outer punch tip by lowering the lower punch (both of the lower center punch 5A and the lower outer punch 5B or the lower outer punch 5B alone)(FIG. 3E) and then further lowering the lower outer punch 5B (FIG. 3F). When required, excess of the molding material for the outer layer OP2 is discharged out of the die (FIG. 3G). Here, it is possible to supply the molding material for the outer layer OP2 after the lower outer punch 5B has been previously lowered sufficiently to protrude the lower center punch tip from the lower outer punch tip. Thereafter, with the lower center punch tip in the position protruding from the lower outer punch tip and with the molding material in the die lightly pressed by the upper center punch and upper outer punch, the lower center punch 5B is lowered while the lower outer punch 5B is raised (FIG. 3H). By so doing, the molding material for the outer layer OP2 is allowed to be led to the space formed by lowering the lower center punch while increasing the density of the outer layer OP2 molding material on the lower outer punch, namely, the density of the sidewall of the molding. Thus, the core is completely covered by the molding material for the outer layer OP2 (FIG. 3I). With the lower center punch tip and the lower outer punch tip thus aligned with each other finally, the upper punch (upper center punch 4A and upper outer punch 4B) and the lower punch (lower center punch 5A and lower outer punch 5B) are moved toward each other to perform main compression finally on the whole molding consisting of the core and the outer layer (FIG. 3J), optionally with pre-compression (temporary compression) when required. FIG. 3K illustrates the step of taking out the completed molding.

Next, a fourth mode for carrying out the method of manufacturing a molding with a core according to the present invention will be described in detail with main reference to FIG. 3. again.

The manufacturing method according to this mode is basically the same as the manufacturing method according to the foregoing mode (third mode) but is different therefrom in that the lower outer punch 5B is raised from the position in which the lower center punch tip is protruded from the lower outer punch tip (FIG. 3G) until the lower outer punch tip and the lower center punch tip become aligned with each other (FIGS. 3H and 3J) without the upper outer punch 4A and upper center punch 4B lightly pressing the molding material in the die. As a result, the molding material for the outer layer OP2 is allowed to be led into the space formed between the temporary molding of the core and the lower center punch 5A, thus completely covering the core. Other steps are the same as in the third mode.

In these modes, there are some preferable conditions for allowing the molding material for outer layer OP2 to be led to between the temporary molding of the core and the lower center punch. The following description is directed to these conditions.

First, the punch tip shape of the double-structured punch is preferably not a flat shape. A punch tip of a flat shape is such that when the lower center punch tip and the lower outer punch tip become aligned with each other in the step of compression-molding the whole molding (main compression) according to the method of the present invention, the two punch tips lie on the same level to form one plane. A punch of the double structure having an unflat punch tip shape is a punch which has a punch tip having an bevel edge surface such that the outer periphery of the lower outer punch rises at an acute angle from the tip end surface of the center punch or a curved surface or the like formed when the lower center punch tip and the lower outer punch tip become aligned with each other. In such a punch of the double structure having an bevel edge surface or a curved surface, the molding material for outer layer OP2 is allowed to be led more suitably as the difference in level between the endmost portion of the lower outer punch tip and the most depressed portion of the lower center punch tip at the time the lower center punch tip and the lower outer punch tip become aligned with each other becomes larger.

In relation to the amount of the molding material for outer layer OP2 to be supplied into the die until the lower center punch tip takes the position protruding from the lower outer punch tip, the preferable amount of the molding material supplied slightly depends upon how the punches slide, that is, to raise the lower outer punch or to lower the lower center punch in the process of aligning the lower center punch tip and the lower outer punch tip with each other. For example, in case the lower outer punch is to be raised, the amount of the molding material for the outer layer to be supplied on the upper surface of the temporary molding of the core is preferably an adequate amount. The "adequate amount", as used herein, is such an amount of the outer layer OP2 molding material as to allow the temporary molding of the core to rise toward the upper punch with the lower outer punch tip rising from the position in which the lower center punch tip is protruded from the lower outer punch tip. On the other hand, in case the lower center punch is to be lowered, the amount of the molding material for the outer layer to be supplied into the space formed by lowering the lower outer punch tip than the lower center punch tip is preferably an adequate amount. The "adequate amount", as used herein, is such an amount of the outer layer that during the final compression (whole compression) the molding material for the outer layer is allowed to be led with collapsing into the space formed above the lower center punch by lowering the lower center punch after pressing the molding material in the die by the upper punch with the lower center punch tip in the position protruding from the lower outer punch tip, thereby completely covering the core, as described above.

Thus allowing the molding material for the outer layer to be led to fill the space between the temporary molding of the core and the lower center punch leads to prevention of contamination with the molding material for the core which is likely to occur on a bottom surface portion of the final molding corresponding to the contour of the center punch. The contamination with the molding material for the core, which is often observed in the conventional method, is caused by a small portion of the temporary molding of the core that is shaved off due to contact with an inner portion of the tip end of the lower outer punch, adheres thereto and remains on the final molding during the process of pressing up the temporary molding of the core and the outer layer into the molding material for the second outer layer in the die. On the other hand, in the method of the present invention, it is considered that as the molding material for the outer layer is allowed to be led to under the molding of the outer layer and the core and to cover the contaminated portion with pressing the portion toward the temporary molding of the core, such contamination can be reduced or prevented.

The method of manufacturing a molding with a core according to the present invention can be practiced by using compression molding means having upper and lower punches which are arranged in the vertical direction of a die, both of the upper punch and the lower punch having a double structure comprising a center punch and an outer punch surrounding the outer periphery of the center punch and being slidable and capable of a compressing operation (see patent document 1). An example of such compression molding means is a rotary compression molding machine described in patent document 2. Basically, the method of the present invention can be practiced easily by means of a hydraulic press provided with upper and lower punches of the double structure and a die. That is, the method of the present invention can be practiced easily by performing a series of steps according to the order of steps of the present invention, comprising: moving the upper and lower punches or center and outer punches to respective predetermined positions manually and/or automatically; supplying the intended molding material (molding material for the outer layer and molding material for the core); and compressing the molding material from above and below by means of the hydraulic press.

Example 1

Hereinafter, examples of the present invention will be described including: example 1 in which the formability of a molding with a core was improved by improving the packing density of the molding material for the outer layer; and examples 2 to 4 as manufacture examples of a molding with a core in each of which the molding material for the outer layer was supplied and led.

Manufacture Example 1

A small amount of magnesium stearate (produced by TAIHEI CHEMICAL INDUSTRIAL CO., LTD.) was applied to the surfaces of respective of upper and lower punches each of which had a double structure with an inner diameter of 5 mmϕ, an outer diameter of 8 mmϕ and a flat bevel and was capable of pressing. With the lower center punch in a lowered position, 30 mg of a spray-dried product of lactose-crystalline cellulose ("Microcellac" produced by MEGGLE hereinafter will be referred to as molding material A) was supplied into the space defined above the lower center punch and enclosed by the lower outer punch. The upper center punch and the lower center punch were then moved toward each other and temporary compression was performed manually on the molding material A to such an extent as to flatten the surface of the molding material A, thus giving a temporary molding of the first outer layer. Subsequently, with the lower center punch in a lowered position, 100 mg of mixed powder consisting of acetaminophen ("ACETAMINOPHENE" produced by Tyco Healthcare Co.) and the molding material A in proportions of 1:3 was supplied into the space defined above the temporary molding of the molding material A previously supplied and enclosed by the lower outer punch. The upper center punch and the lower center punch were then moved toward each other and temporary compression was performed at a compressive pressure of 0.3 kN by means of a universal tension and compression tester ("AG-I 20 kN" manufactured by Shimadzu Corporation.), to give a temporary molding of the core. Finally, the lower punch was lowered and further the lower outer punch was lowered to take a position in which the tip end portion of the lower outer punch was lower than the tip end portion of the lower center punch by 3 mm (about 0.7 times as large as the thickness of the temporary molding of the outer layer and the core). With the lower punch in this condition, 260 mg of remaining molding material A was supplied into a space defined above and around the temporary molding consisting of the aforementioned outer layer and the core in the die to cover the temporary molding of the core with molding material A completely. With the upper punch pressing molding material A in the die, the lower outer punch was raised manually until its punch tip aligned with the lower center punch tip. The upper punch and the lower punch were then moved toward each other and tableting was performed at a compressive pressure of 7.5 kN by means of the aforementioned universal tension and compression tester. The weight of the obtained tablet was 390 mg per tablet.

Comparative Manufacture Example 1

A tablet was prepared under the same conditions as in the manufacture example 1 except that the supply of molding material A to cover the temporary molding of the core in the manufacture example 1 was performed with the punch tip end portions of the lower outer punch and the lower center punch aligned with each other (with the amount of descent set to 0 mm). The weight of the obtained tablet was 390 mg per tablet.

Experimental Example 1

(a) Evaluation of Tablet Hardness

The tablet hardness of each of the tablets obtained by manufacture example 1 and comparative manufacture example 1 was evaluated by measuring the maximum stress at destruction on each of the tablets pressed diametrically by means of a rheometer (manufactured by SUN SCIENTIFIC CO., LTD.). The results were as shown in Table 1.

(b) Evaluation of Friability

The friability of each of the tablets obtained by manufacture example 1 and comparative manufacture example 1 was evaluated by using a motor-driven drum (ELECTROLAB: EF1-W) according to a test method of determining the friability test of tablet (equivalent to USP24 General/information <1216> TABLET FRIABILITY) as reference information in Japanese Pharmacopoeia, 13$^{th}$ revision, second addenda. The results were as shown in Table 1.

TABLE 1

| EVALUATION ITEM | COMPARATIVE MANUFACTURE EXAMPLE 1 AMOUNT OF DESCENT OF THE LOWER OUTER PUNCH 0 mm | MANUFACTURE EXAMPLE 1 AMOUNT OF DESCENT OF THE LOWER OUTER PUNCH 3 mm |
|---|---|---|
| TABLET HARDNESS (MEAN VALUE) | 61.7~52.0N (58.0N) | 82.4~72.0N (78.3N) |
| TABLET FRIABILITY | 1.49% | 1.09% |

As can be seen from table 1, manufacture example 1 in which the amount of descent of the lower outer punch was 3 mm was superior in both of tablet hardness and friability to comparative manufacture example 1 in which the amount of descent of the lower outer punch was 0 mm. From these results, it was concluded that the tablet manufactured with the amount of descent of the lower outer punch set to 3 mm had an improved packing density of outer layer and hence, improved formability as compared with the tablet manufactured with the amount of descent of the lower outer punch set to 0 mm.

Example 2

Manufacture Example 2

A small amount of magnesium stearate was applied to the surfaces of respective of upper and lower punches each of which had a double structure with an inner diameter of 7 mmϕ, an outer diameter of 8 mmϕ and a flat bevel and was capable of pressing. With the lower center punch in a lowered position, 100 mg of a spray-dried product of lactose-crystalline cellulose (molding material A) for the core was supplied into the space defined above the lower center punch and enclosed by the lower outer punch. The upper center punch and the lower center punch were then moved toward each other and temporary compression of the core was performed at a compressive pressure of 1 kN by means of the universal tension and compression tester ("AG-I 20 kN" manufactured by Shimadzu Corporation). Subsequently, the lower outer punch was lowered to take a position in which the tip end portion of the lower outer punch was lower than the tip end portion of the lower center punch by 1, 2 or 3 mm. With the lower punch in this condition, 130 mg of remaining molding material that was colored with Food Red No. 3 dye (produced by FFI Corporation) was supplied into the space defined above and around the temporary molding of the core. With the upper punch pressing the molding material A in the die, the lower center punch was lowered manually until its punch tip aligned with the lower outer punch tip. The upper punch and the lower punch were then moved toward each other and tableting was performed at a compressive pressure of 5 kN by means of the aforementioned universal tension and compression tester. The weight of the obtained tablet was 230 mg per tablet.

Comparative Manufacture Example 2

A tablet was manufactured under the same conditions as in the manufacture example 2 except that the supply of colored molding material A in the manufacture example 2 was performed with the tip end portions of the lower outer punch and the lower center punch aligned with each other (with the amount of descent set to 0 mm). The weight of the obtained tablet was 230 mg per tablet.

Test Example 2

(a) Evaluation of the Effect of Leading Molding Material

The bottom surface of each of the tablets of manufacture example 2 and comparative manufacture example 2 was observed to evaluate the colored outer layer being led to under the core layer.

TABLE 2

| AMOUNT OF DESCENT OF LOWER OUTER PUNCH | COMPARATIVE MANUFACTURE EXAMPLE 2 0 mm | MANUFACTURE EXAMPLE 2 1 mm | MANUFACTURE EXAMPLE 2 2 mm | MANUFACTURE EXAMPLE 2 3 mm |
|---|---|---|---|---|
| REVERSE SIDE CONDITION OF TABLET |  |  |  |  |
| | NO EFFECT OF LEADING MOLDING MATERIAL | PARTIAL EFFECT OF LEADING MOLDING MATERIAL | PARTIAL EFFECT OF LEADING MOLDING MATERIAL | FULL EFFECT OF LEADING MOLDING MATERIAL |

As can be seen from table 2, the amount of the molding material for the outer layer to be led to under the bottom portion of the temporary molding of the core was observed to increase with increasing amount of descent of the lower outer punch in the manufacture example 2 and it was m certain that the amount of descent of the lower outer punch set to 3 mm (the same as the thickness of the temporary molding of the core) allowed the molding material to cover the molding of the core completely. As can be understood from these results, by performing the step of supplying the molding material for the outer layer with the lower outer punch tip positioned lower than the lower center punch tip to allow the molding material to be led to under the temporary molding of the core, a molding with a core can be manufactured through only two molding material supply steps, i.e., the step of supplying the molding material for the core and the subsequent step of supplying the molding material for the outer layer.

Example 3

Manufacture Example 3

Figure 4:
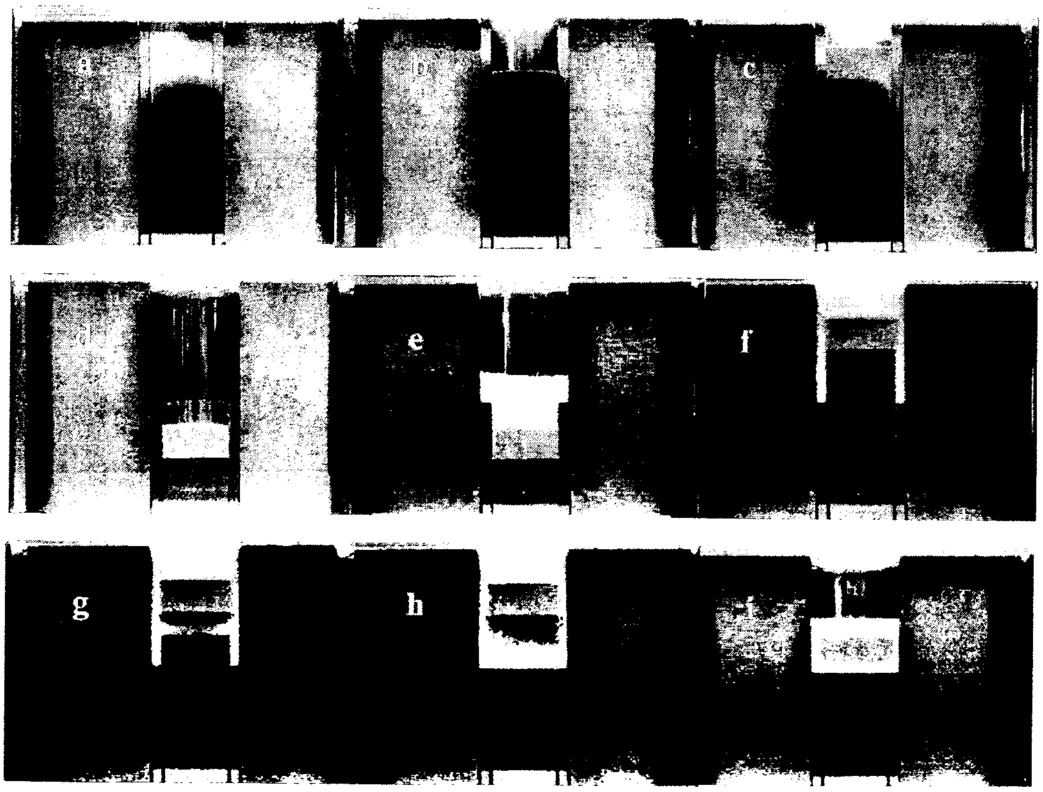
FIG. 4 is a photograph illustrating movement of punch tips in example 3 of the method of manufacturing a molding with a core according to the present invention.

Description will be made of manufacture example 3 in accordance with the flow shown in FIG. 4. Upper and lower punches each of which had a double structure with an inner diameter of 6 mmϕ, an outer diameter of 8 mmϕ and a flat bevel and was capable of pressing were each sectioned along the direction of compression, and reinforced glass was fitted on a die which was sectioned to allow the condition of powder under compression to be observed visually. Further, a small amount of magnesium stearate was applied to the each surface of the punches and the die. With the lower center punch in a lowered position, a spray-dried product of lactose-crystalline cellulose (molding material A) that was colored with Food Red No. 3 dye was supplied into the space defined above the lower center punch and enclosed by the lower outer punch. The upper center punch and the lower center punch were then moved toward each other and temporary compression was performed manually to such an extent as to flatten the surface of the molding material A, thus giving a temporary molding of the core (FIGS. 4*c* and 4*d*). Subsequently, the lower punch was lowered and further the lower outer punch was lowered to a position in which the lower center punch was protruded by about 3 mm from the lower outer punch. With the lower punch in this condition, the uncolored molding material A was supplied into the space defined above and around the temporary molding of the core in the die. With the lower punch kept in the aforementioned condition, the temporary molding of the core and the uncolored molding material A in the die were pressed manually (FIG. 4*f*). Thereafter, the lower center punch was lowered manually until its punch tip aligned with the lower outer punch tip (FIG. 4*g*) to form a space between the colored temporary molding of the core and the lower center punch for the molding material A to be led into the space (FIG. 4*h*). Further, the upper punch and the lower punch were moved toward each other and manual compression was performed to allow the uncolored molding material A to be led with collapsing into this space. In this way, it was possible to manufacture a tablet with a core by performing the supply of powder only twice. FIG. 4*i* shows a tablet with a core in a condition ready to be taken out.

Example 4

Manufacture Example 4

Figure 5:
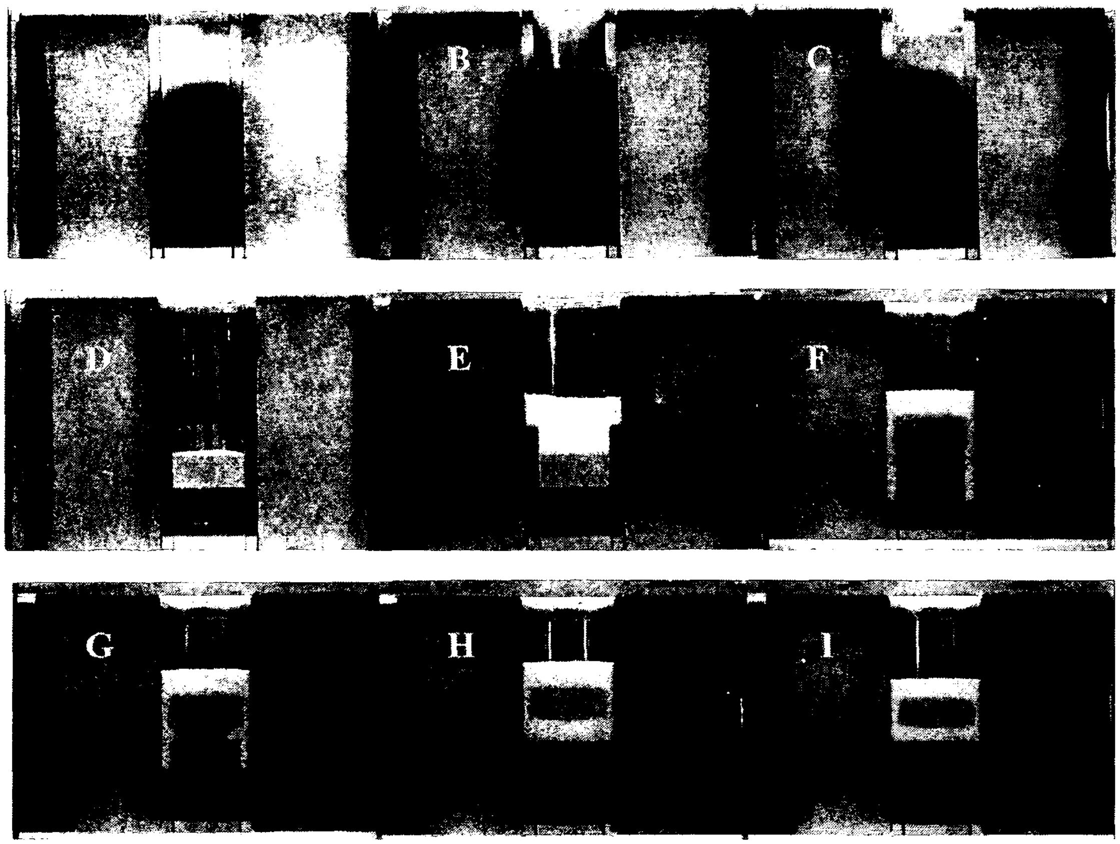
FIG. 5 is a photograph illustrating movement of punch tips in example 4 of the method of manufacturing a molding with a core according to the present invention.

Description will be made of manufacture example 4 in accordance with the flow shown in FIG. 5. The punches and die used in this example were the same as in example 3. With the lower center punch in a lowered position, a spray-dried product of lactose-crystalline cellulose (molding material A) that was colored with Food Red No. 3 dye was supplied into the space defined above the lower center punch and enclosed by the lower outer punch. The upper center punch and the lower center punch were then moved toward each other and temporary compression was performed manually to such an extent as to flatten the surface of the molding material A, thus giving a temporary molding of the core (FIG. 5C). Subsequently, the lower punch was lowered and further the lower outer punch was lowered to a position in which the lower center punch was protruded by about 3 mm from the lower outer punch. With the lower punch in this condition, the uncolored molding material A was supplied into the space defined above and around the temporary molding of the core in the die (FIG. 5F). With the upper punch exerting no compression on the temporary molding of the core and the uncolored molding material A in the die, the lower outer punch was raised manually until its punch tip aligned with the lower center punch tip, so that the colored temporary molding of the core was raised toward the upper punch (FIG. 5G) with the rising of the lower outer punch to form a space between the temporary molding of the core and the lower center punch for the molding material A to be led into the space (FIGS. 5G and 5H). Further, the upper punch and the lower punch were moved toward each other and the manual compression was performed to allow the uncolored molding material A to be led with collapsing into thus space. In this way, it was possible to manufacture a tablet with a core by performing the supply of powder only twice. FIG. 5I shows a tablet with a core in a condition ready to be taken out.

INDUSTRIAL APPLICABILITY

The present invention can find wide application in manufacturing a molding by compressing molding material represented by powder granule, for example, in molding of pharmaceuticals, foods, agricultural chemicals, sanitary products, powder metallurgy-related products and the like, in molding of semiconductor encapsulating resin for electronic functional parts, and in molding of battery-related products and the like.

The manufacturing method of the present invention can be practiced by using a rotary compression molding machine comprising: dies mounted at a predetermined pitch on a turntable rotatably mounted in a frame, the dies each having a die bore; and upper and lower punches each having a double structure according to the present invention which are vertically slidably held on the upper and lower sides of each die, wherein molding material supplied in each die is compression-molded by pressing the upper and lower punches inserted in the die bore of each die.

The invention claimed is:

1. A method for manufacturing a molding which comprises a core and an outer layer by using a compression molding apparatus having an upper punch and a lower punch which are arranged in the vertical direction of a die, both of the upper punch and the lower punch having a double structure comprising a center punch and an outer punch surrounding the outer periphery of the center punch, and being slidable and capable of a compressing operation; the method comprising:

- a core supply step of supplying molding material for the core into a space defined above the lower center punch and surrounded by the lower outer punch;
- a core molding step of compression-molding the molding material for the core supplied in the preceding step;
- an outer layer supply step of supplying molding material for the outer layer into a space defined above and around the core molding in the die molded in the preceding step until a tip of the lower center punch finally takes a position protruding from a tip of the lower outer punch by lowering the lower outer punch; and
- a whole molding step of compression-molding the core molding and the molding material for the outer layer with the tips of the lower outer punch and the lower center punch aligned with each other,
- wherein an outer layer supply step of supplying the molding material for the outer layer into the space defined above the lower center punch and surrounded by the lower outer punch is not performed prior to the core supply step.

2. The method according to claim 1, wherein the lower outer punch is raised to align the tip thereof with the tip of the lower center punch from the position in which the tip of the lower center punch is protruded from the tip of the lower outer punch after the outer layer supply step posterior to the core molding step.

3. The method according to claim 1, wherein the lower center punch is lowered to align the tip thereof with the tip of the lower outer punch from the position in which the tip of the lower center punch is protruded from the tip of the lower outer punch after the outer layer supply step posterior to the core molding step.

4. The method according to claim 1, wherein the lower center punch is lowered while the lower outer punch is raised to align the tips of the lower outer punch and the lower center punch with each other from the position in which the tip of the lower center punch is protruded from the tip of the lower outer punch after the outer layer supply step posterior to the core molding step.

5. The method according to claim 2, wherein the operation of aligning the tips of the lower outer punch and the lower center punch with each other is performed with the upper center punch and upper outer punch pressing the molding material in the die after the outer layer supply step posterior to the core molding step.

6. The method according to claim 3, wherein the process of pressing the molding material in the die by the upper center punch and the upper outer punch is performed with the tip of the lower center punch in the position protruding from the tip of the lower outer punch after the outer layer supply step posterior to the core molding step.

7. The method according to claim 2, wherein the process of pressing the molding material in the die by the upper center punch and the upper outer punch is not performed until the tips of the lower outer punch and the lower center punch become aligned with each other after the outer layer supply step posterior to the core molding step.

8. The method according to claim 4, wherein the operation of aligning the tips of the lower outer punch and the lower center punch with each other is performed with the upper center punch and upper outer punch pressing the molding material in the die after the outer layer supply step posterior to the core molding step.

9. A method for manufacturing a molding which comprises a core and an outer layer by using a compression molding apparatus having an upper punch and a lower punch which are arranged in the vertical direction of a die, both of the upper punch and the lower punch having a double structure comprising a center punch and an outer punch surrounding the outer periphery of the center punch, and being slidable and capable of a compressing operation; the method consisting essentially of:

- a core supply step of supplying molding material for the core into a space defined above the lower center punch and surrounded by the lower outer punch;
- a core molding step of compression-molding the molding material for the core supplied in the preceding step;
- an outer layer supply step of supplying molding material for the outer layer into a space defined above and around the core molding in the die molded in the preceding step until a tip of the lower center punch finally takes a position protruding from a tip of the lower outer punch by lowering the lower outer punch; and
- a whole molding step of compression-molding the core molding and the molding material for the outer layer with the tips of the lower outer punch and the lower center punch aligned with each other,
- wherein an outer layer supply step of supplying the molding material for the outer layer into the space defined above the lower center punch and surrounded by the lower outer punch is not performed prior to the core supply step.

* * * * *